United States Patent [19]

Nowlin

[11] Patent Number: 4,738,942
[45] Date of Patent: Apr. 19, 1988

[54] CATALYST COMPOSITION FOR POLYMERIZING ALPHA-OLEFIN POLYMERS OF RELATIVELY NARROW MOLECULAR WEIGHT DISTRIBUTION AND HIGH MELT INDEX

[75] Inventor: Thomas E. Nowlin, Somerset, N.J.

[73] Assignee: Mobil Oil Corporation, New York, N.Y.

[21] Appl. No.: 15,581

[22] Filed: Feb. 17, 1987

Related U.S. Application Data

[63] Continuation of Ser. No. 812,024, Dec. 23, 1985, abandoned.

[51] Int. Cl.$^4$ ............... C08F 4/64; C08F 4/68; C08F 4/62
[52] U.S. Cl. ................ 502/104; 502/119; 502/120; 502/131; 502/133; 502/134; 526/124
[58] Field of Search ............. 502/104, 119, 120, 131, 502/133, 134

[56] References Cited

U.S. PATENT DOCUMENTS

| | | | |
|---|---|---|---|
| 3,135,809 | 6/1964 | Bosmajian | 502/103 X |
| 4,342,855 | 8/1982 | Arimoto et al. | 502/119 X |
| 4,387,200 | 6/1983 | Gessell et al. | 526/122 |
| 4,468,477 | 8/1984 | Caunt et al. | 502/104 |
| 4,481,301 | 11/1984 | Nowlin et al. | 502/120 X |
| 4,550,095 | 10/1985 | Imai et al. | 502/119 |
| 4,551,440 | 11/1985 | Imai et al. | 502/119 |
| 4,593,009 | 6/1986 | Nowlin | 502/104 X |

OTHER PUBLICATIONS

Rideal, *Concepts in Catalysis*, pub. by Academic Press, N.Y., N.Y. (1968), p. 5.

Primary Examiner—Patrick P. Garvin
Attorney, Agent, or Firm—Alexander J. McKillop; Michael G. Gilman; Stanislaus Aksman

[57] ABSTRACT

A catalyst composition for polymerizing alpha-olefins is prepared by treating a carrier with a mixture of at least one organomagnesium composition of the formula $$(OR')_n Mg(OR)_m \qquad (I)$$

where R and R' are the same or different $C_1-C_{12}$ hydrocarbyl groups, m and n are each 0, 1 or 2, m+n = valence of Mg, and a compound of the formula $$MX_p \qquad (II)$$

where M is Si, C, Ge or Sn, X is Cl or Br, and p is the valence of M, in a solvent capable of dissolving the mixture. The product of this step may or may not be dried. Subsequently, it is contacted with a transition metal compound.

The polymer resins produced with the resulting catalyst have relatively narrow molecular weight distribution and high melt index values.

96 Claims, No Drawings

CATALYST COMPOSITION FOR POLYMERIZING ALPHA-OLEFIN POLYMERS OF RELATIVELY NARROW MOLECULAR WEIGHT DISTRIBUTION AND HIGH MELT INDEX

This is a continuation of application Ser. No. 812,024, filed on Dec. 23, 1985, now abandoned.

BACKGROUND OF THE INVENTION

1. Field of the Invention

The present invention relates to a method for polymerizing alpha-olefins, a catalyst for such a polymerization method and a method for producing such a catalyst. A particular aspect of the present invention relates to a method for preparing a catalyst which produces linear low density polyethylene (LLDPE) and high density polyethylene (HDPE) having a relatively narrow molecular weight distribution, as evidence by relatively low values of melt flow ratios (MFR), suitable for film and injection molding applications.

2. Description of the Prior Art

Linear low density polyethylene polymers possess properties which distinguish them from other polyethylene polymers, such as homopolymers of polyethylene. Certain of these properties are described in Anderson et al, U.S. Pat. No. 4,076,698.

Karol et al, U.S. Pat. No. 4,302,566, describe a process for producing certain linear low density polyethylene polymers in a gas phase, fluid bed reactor.

Graff, U.S. Pat. No. 4,173,547, Stevens et al, U.S. Pat. No. 3,787,384, Strobel et al, U.S. Pat. No. 4,148,754, and Ziegler, deceased, et al. U.S. Pat. No. 4,063,009, each describe various polymerization processes suitable for producing forms of polyethylene other than linear low density polyethylene, per se.

Graff, U.S. Pat. No. 4,173,547, describes a supported catalyst obtained by treating a support with both an organoaluminum compound and an organomagnesium compound followed by contacting this treated support with a tetravalent titanium compound.

Stevens et al, U.S. Pat. No. 3,787,384, and Strobel et al, U.S. Pat. No. 4,148,754, describe a catalyst prepared by first reacting a support (e.g., silica containing reactive hydroxyl groups) with an organomagnesium compound (e.g., a Grignard reagent) and then combining this reacted support with a tetravalent titanium compound. According to the teachings of both of these patents, no unreacted organomagnesium compound is present when the reacted support is contacted with the tetravalent titanium compound.

Ziegler, deceased, et al, U.S. Pat. No. 4,063,009, describe a catalyst which is the reaction product of an organomagnesium compound (e.g., an alkylmagnesium halide) with a tetravalent titanium compound. The reaction of the organomagnesium compound with the tetravalent titanium compound takes place in the absence of a support material.

A vanadium-containing catalyst, used in conjunction with triisobutylaluminum as a co-catalyst, is disclosed by W. L. Carrick et al in *Journal of American Chemical Society*, Volume 82, page 1502 (1960) and Volume 83, page 2654 (1961).

Nowlin et al, U.S. Pat. No. 4,481,301, the entire contents of which are incorporated herein by reference, disclose a supported alpha-olefin polymerization catalyst composition prepared by reacting a support containing OH groups with a stoichiometric excess of an organomagnesium composition, with respect to the OH groups content, and then reacting the product with a tetravalent titanium compound.

When the LLDPE or HDPE resins are fabricated into injection-molded products, it is imperative to assure that such products are not susceptible to warping or shrinking. As is known to those skilled in the art, the degree of warping or shrinking can be predicted from the molecular weight distribution of the resins. Resins having relatively narrow molecular weight distribution produce injection-molded products exhibiting a minimum amount of warping or shrinkage. Conversely, resins having relatively broad molecular weight distribution produce injection-molded products more likely to undergo warping or shrinkage. One of the measures of the molecular weight distribution of the resin is melt flow ratio (MFR), which is the ratio of high melt flow index (HLMI or $I_{21}$) to melt index ($I_2$) for a given resin. Resins having relatively low MFR values, e.g., of about 20 to about 50, have relatively narrow molecular weight distribution. Additionally, LLDPE resins having such relatively low MFR values produce films of better strength properties than resins with high MFR values.

Another important property of the resins used in injection molding applications is melt index ($I_2$). As is also known to those skilled in the art, resins having relatively high $I_2$ values, of e.g., 5–200, when melted in the extruder, have a relatively low viscosity. Low viscosity is important in such applications because it enables the molten resin to completely occupy the volume of the mold to consistently produce high quality injection molded products and minimize the number of faulty products.

It is possible, as is known to those skilled in the art, to increase the melt index of a resin by increasing the amount of hydrogen ($H_2$) introduced into the polymerization reactor. However, the use of excessive amounts of hydrogen decreases the reactor volume available for the alpha-olefin reactants, especially ethylene, thereby reducing production rates.

Accordingly, it is important to provide a catalyst composition capable of producing alpha-olefin polymers having both, relatively narrow molecular weight distribution (low MFR values) and relatively high melt index ($I_2$) without the use of large amounts of hydrogen.

It is a primary object of the present invention to prepare a high activity catalyst for the polymerization of alpha-olefins which yields products of a relatively narrow molecular weight distribution and relatively high melt index suitable for films and injection molding applications.

It is an additional object of the present invention to provide a catalytic process for polymerizing alpha-olefins which yields linear low density polyethylene of a relatively narrow molecular weight distribution.

SUMMARY OF THE INVENTION

A supported alpha-olefin polymerization catalyst composition of this invention is prepared in a multi-step or in a single step process.

In the multi-step process, in the first step, a solid, porous carrier is contacted with a solution of a mixture of at least one organomagnesium composition of the empirical formula $$(OR')Mg(OR)_m \tag{I}$$

where R and R' are the same or different and they are $C_1$–$C_{12}$ hydrocarbyl groups, m and n are each 0, 1 or 2, providing that the sum of m+n equals the valence of Mg, and at least one compound of the formula $$MX_p \qquad (II)$$

where M is Si, C, Ge or Sn, X is Cl or Br and p is the valence of M, in a solvent capable of dissolving the mixture. The number of moles of the compound (II) must be at least sufficient to substantially completely dissolve the organomagnesium composition in the solution.

In the second step, the liquid is carefully removed, e.g., evaporated, to assure that none or very little of magnesium-containing compound(s) is removed from the reaction mixture and that most, if not all, of the magnesium-containing compound(s) are retained on the carrier. The product of this step is a solid, supported magnesium (Mg) composition in the form of a dry, free-flowing powder.

In the third synthesis step, the powder is slurried in a liquid medium and the resulting slurry is contacted with at least one transition metal compound, soluble in the liquid medium. The supported magnesium composition is substantially insoluble in the liquid medium. Accordingly, a reacted form of transition metal insoluble in the liquid medium becomes supported on the carrier.

In a single step catalyst synthesis process, the solid, porous carrier is contacted with a solution of the mixture of at least one organomagnesium composition of the formula (I) and at least one compound of formula (II) in a solvent capable of dissolving the mixture, and the resulting slurry is contacted with at least one transition metal compound.

The invention is also directed to an alpha-olefin polymerization process conducted in the presence of the catalyst of this invention which produces polymer resins having relatively narrow molecular weight distribution and relatively high values of melt index.

DETAILED DESCRIPTION OF THE INVENTION

The polymers prepared in the presence of the catalyst compositions of this invention are linear polyethylenes which are homopolymers of ethylene or copolymers of ethylene and higher alpha-olefins. The polymers exhibit relatively high values of melt index ($I_2$) and relatively low values of melt flow ratio (MFR), as compared to similar polymers prepared in the presence of previously-known catalyst compositions, e.g., those disclosed by Nowlin et al, U.S. Pat. No. 4,481,301. Thus, the polymers prepared with the catalyst compositions of this invention are especially suitable for the production of films and injection molding applications.

Catalysts produced according to the present invention are described below in terms of the manner in which they are made.

Multi-Step Catalyst Synthesis

The carrier materials are solid, particulate porous materials which are inert to the other components of the catalyst composition and to the other active components of the reaction system. These carrier materials include inorganic materials, such as oxides of silicon and/or aluminum. The carrier materials are used in the form of dry powders having an average particle size of from about 1 micron to about 250 microns, preferably from about 10 microns to about 150 microns. These materials are also porous and have a surface area of at least about 3 square meters per gram, and preferably at least about 50 square meters per gram. The carrier material should be dry, that is, free of absorbed water. Drying of the carrier material can be effected by heating, e.g., at a temperature of at least 600° C. when silica is employed as the support. Alternatively, when a silica support is employed, it may be dried at a temperature of at least 200° C. and treated with about 1 weight percent to about 8 weight percent of one or more of the catalyst activator compounds described below.

In the most preferred embodiment, the carrier is silica which, prior to the use thereof in the first catalyst synthesis step, has been dehydrated by fluidizing with nitrogen and heating at about 800° C. for about 16 hours to achieve a surface hydroxyl concentration of about 0.4 mmols/gm. The silica of the most preferred embodiment is a high surface area, amorphous silica (surface area=300 m²/gm; pore volume of 1.65 cm³ per gram), and it is a material marketed under the tradenames of Davison 952 or Davison 955 by the Davison Chemical Division of W. R. Grace and Company. The silica is in the form of spherical particles, e.g., as obtained by a spray-drying process.

The carrier material is treated with the previously-prepared solution of a mixture of at least one organomagnesium composition having the empirical formula (I) and at least one compound of the formula (II) in a solvent, the organomagnesium composition being capable of reacting with a transition metal compound soluble in non-polar solvents. The solution is prepared by introducing the organomagnesium composition into the solvent and refluxing it for a period of time, e.g., about ½ to about 12 hours. The resulting slurry is then allowed to cool to ambient temperature. We found that the organomagnesium composition does not dissolve in the solvent in the absence of at least one compound of formula (II). Accordingly, such a compound is added to the slurry, preferably dropwise, to promote rapid dissolution of the organomagnesium composition in the solvent. Subsequently, the carrier is added to the solution and the solution is refluxed for about 0.1 to about 10, preferably about 0.5 to about 5, and most preferably about 1.0 to about 2.0 hours, at a temperature of about 25 to about 200, preferably about 50 to about 100, and most preferably about 60° to about 80° C.

The organomagnesium composition has the empirical formula $(OR')_nMg(OR)_m$, where R and R' are the same or different and they are $C_1$–$C_{12}$ hydrocarbyl groups, preferably $C_1$–$C_{12}$ alkyl groups, more preferably $C_1$–$C_{12}$ unsubstituted alkyl groups, yet more preferably $C_1$–$C_4$ alkane groups and most preferably $C_2$–$C_4$ alkane groups, and m and n are each 0, 1 or 2 providing that m+n=valence of Mg. In the most preferred embodiment, the organomagnesium composition is $Mg(OC_2H_5)_2$.

The compound of formula (II) has the empirical formula $$MX_p$$

where M is Si, C, Ge, or Sn, preferably Si or Sn, and most preferably Si, X is Cl or Br, preferably Cl, and p is the valence of M. In the most preferred embodiment, the compound of formula (II) is $SiCl_4$.

Preferably, the carrier is treated with the aforementioned solution in such a manner that, after the treatment is completed, the carrier has magnesium incorporated into the pores thereof. As used herein, the concept of incorporating a material onto a carrier is intended to encompass the incorporation of the material (e.g., magnesium or transition metals) onto the carrier by physical or chemical means. Accordingly, the incorporated material need not necessarily be chemically bound to the carrier. As a result of this treatment, magnesium becomes supported or incorporated onto the carrier by chemical or physical means. Without wishing to be bound by any theory of operability, it is believed that magnesium does not chemically react with the OH groups of the carrier, and that it is supported or incorporated (e.g., impregnated) onto the carrier due to polar interactions between magnesium and the surface of the carrier.

Suitable solvents used in the first catalyst synthesis step are the same as liquids disclosed by Nowlin et al, U.S. Pat. No. 4,481,301. Accordingly, only the most important features of such solvents will be discussed herein.

Suitable solvents are electron donor compounds, also known as Lewis bases. Suitable electron donor compounds include alkyl esters of aliphatic and aromatic carboxylic acids, aliphatic ethers, cyclic ethers and aliphatic ketones, preferably alkyl esters of saturated aliphatic carboxylic acids containing from 1 to 4 carbon atoms; alkyl esters of aromatic carboxylic acids containing from 7 to 8 carbon atoms; aliphatic ethers containing from 2 to 8 carbon atoms, preferably from 4 to 5 carbon atoms; cyclic ethers containing from 4 to 5 carbon atoms, preferably mono- or di-ethers containing 4 carbon atoms; and aliphatic ketones containing from 3 to 6 carbon atoms, preferably from 3 to 4 carbon atoms. The most preferred electron donor compounds are ethers, such as aliphatic ethers, e.g., diethyl ether, diisopropyl ether, dibutyl ether, dipentyl ether, and ethyl n-butyl ether and cyclic ethers, such as tetrahydrofuran and dioxane. Thus, the solvent containing the mixture of the organomagnesium composition and the compound of formula (I) is usually an ether, preferably tetrahydrofuran.

The amount of the organomagnesium composition in the solution used to contact the carrier is not critical, but it must be sufficient to produce a high activity catalyst, e.g., having the activity of about 500 to about 10,000 grams of polyethylene per gram of catalyst per 3 hours (gmsPE/gm cat/3 hrs), once the reaction with a transition metal compound is completed. Generally speaking, the amount of the organomagnesium composition contained in the solution is such that the final catalyst composition, (i.e., after the reaction with the transition metal compound is completed), contains about 0.1 to about 2, preferably about 0.5 to about 1.5 millimoles of Mg per gram of the catalyst (mmol Mg/gm).

The molar amount of the compound of formula $MX_p$ in the solution used in the first step is at least sufficient to substantially completely dissolve the organomagnesium composition in the solution. The molar ratio of that compound to the organomagnesium composition is about 0.1 to about 10, and preferably about 0.5 to about 2. The use of smaller amounts of the compound of formula (II) may be insufficient to promote the complete solubility of the organomagnesium composition in the solvent used in the first catalyst synthesis step.

To assure that most, if not all, of the magnesium-containing compound(s) are retained on the carrier in the third synthesis step, the solvent is removed from the reaction vessel with care to assure that none or very little magnesium-containing compound(s) is removed with it. The solvent may be removed by any means assuring that substantially all of the magnesium-containing compound(s) remain on the carrier, e.g., by distillation of the mixture of the impregnated carrier and the solvents, evaporation, decantation or centrifugation. Evaporation at about the boiling point of the solvent is the most preferred method of solvent removal. It is also important that the product of the second synthesis reaction step is not subjected to washing or rinsing, so that the excess of the magnesium-containing compound or compounds which are not supported or incorporated onto of the carrier is retained on the carrier.

The amount of magnesium-containing compound(s) which is incorporated onto the carrier should be sufficient to react with the transition metal, in order to incorporate a catalytically effective amount of transition metal on the carrier in the manner set forth hereinbelow. Thus, the carrier should comprise from about 0.1 to about 50, preferably about 0.1 to about 5 millimoles (mmoles) of magnesium per gram of carrier (after the treatment of the carrier with the organomagnesium composition is completed).

The free-flowing powder obtained in the second step is reacted with at least one transition metal compound dissolved in a non-polar solvent (also referred to herein as a liquid medium diluent or a liquid medium). The transition metal compound is soluble in this solvent, while the treated carrier (i.e., the free-flowing powder), including the magnesium-containing compound(s), is insoluble therein. Thus, the reaction which takes place between the transition metal and the reactive magnesium-containing compound(s) is a reaction of a liquid with a solid. It is further noted that the reacted transition metal is insoluble in the solvent.

Suitable transition metal compounds used herein are compounds of metals of Groups IVA, VA, VIA or VIII of the Periodic Chart of the Elements, as published by the Fisher Scientific Company, Catalog No. 5-702-10, 1978, providing that such compounds are soluble in non-polar solvents. Non-limiting examples of such compounds are titanium and vanadium halides, e.g., titanium tetrachloride, $TiCl_4$, vanadium tetrachloride, $VCl_4$, vanadium oxytrichloride, $VOCl_3$, titanium and vanadium alkoxides, wherein the alkoxide moiety has a branched or unbranched alkyl radical of 1 to about 20 carbon atoms, preferably 1 to about 6 carbon atoms. The preferred transition metal compounds are titanium compounds, preferably tetravalent titanium compounds. The most preferred titanium compound is titanium tetrachloride.

Mixtures of such transition metal compounds may also be used and generally no restrictions are imposed on the transition metal compounds which may be included. Any transition metal compound that may be used alone may also be used in conjunction with other transition metal compounds.

Suitable non-polar solvents are materials in which the transition metal compounds are at least partially soluble and which are liquid at reaction temperatures. Preferred non-polar solvents are alkanes, such as hexane, n-heptane, octane, nonane, and decane, although a variety of other materials including cycloalkanes, such as cyclohexane, aromatics, such as benzene and ethylbenzene, and halogenated aromatics, such as chlorobenzene or ortho-dichlorobenzene, can be employed. The most preferred non-polar solvent is hexane. Prior to use, the non-polar solvent should be purified, such as by percolation through silica gel and/or molecular sieves, to remove traces of water, oxygen, polar compounds, and other materials capable of adversely affecting catalyst activity.

The magnesium-containing dry, free-flowing powder is reacted with one or more transition metal compound(s) at a temperature and for a time sufficient to yield a solid catalyst component. Temperatures at which this reaction is conducted range from about −40° to about 250° C., preferably, from about 0° to about 170° C., and most preferably, the reaction is conducted at a temperature of 25°–100° C. Suitable reaction times range from about ½ to about 25 hours, with about ½ to about 6 hours being preferred.

The reaction of the transition metal in the non-polar solvent with the magnesium-containing carrier material conveniently takes place by slurrying the solid carrier in the non-polar solvent, adding the transition metal compound to the slurry and heating the liquid reaction medium to a suitable reaction temperature, e.g., to the reflux temperature of the non-polar solvent at standard atmospheric pressure. Thus, the reaction usually takes place under reflux conditions.

The various reaction parameters can be widely varied, suitable selection of such parameters being well within the capability of those having ordinary skill in the art. The volume of the transition metal compound solution added to the magnesium-containing carrier initially slurried in the solution is from about 0.1 to about 10 milliliters (mls) per gram of such a carrier. The concentration of the transition metal compound solution is, for example, from about 0.1 to about 5 Molar. The molar amount of the transition metal compound in the solution may be varied, but it is most preferably at least about equal to the molar amount of the magnesium (Mg) in the solution. Thus, the molar ratio of the transition metal to magnesium is about 0.3 to about 10, preferably about 0.4 to about 6, more preferably about 0.8 to about 1.5.

To assure that most, if not all, of the transition-metal-containing compound(s) which reacted with the organomagnesium composition are retained in the product of the last catalyst synthesis step, the liquid medium may be evaporated to dryness or filtered and washed with a non-polar solvent, e.g., hexane or heptane, which does not remove the reacted transition metal component(s) from the silica. If the solid filter residue is washed with a solvent, the solvent removes any unreacted transition metal.

If the molar amount of the transition metal to Mg is about 0.3 to about 0.9 (i.e., stoichiometric or lesser amount of the transition metal is used with respect to the Mg), it may be unnecessary to wash the product of the second step with a suitable solvent, e.g., one of the non-polar solvents used in the second synthesis step, to remove an excess of the transition metal.

As indicated above, the catalysts of the present invention are prepared in the substantial absence of water, oxygen, and other catalyst poisons. Such catalyst poisons can be excluded during the catalyst preparation steps by any well known methods, e.g., by carrying out the preparation under an atmosphere of nitrogen, argon or other inert gas. An inert gas purge can serve the dual purpose of excluding external contaminants during the preparation and removing undesirable reaction by-products resulting from the preparation of the neat, liquid reaction product. Purification of any electron donor compounds and solvents employed in the first and third preparative steps, respectively, in the manner described above also is helpful in this regard.

Single Step Catalyst Synthesis

In a single step catalyst synthesis procedure, the carrier, the organomagnesium composition, the compound of formula (II), and the transition metal compound used are identical to those used in the multi-step catalyst synthesis process. The solvent capable of dissolving the mixture of the organomagnesium composition and the compound of formula (II), used in the first step of the multi-step synthesis, is the only solvent used in the single step catalyst synthesis. In this embodiment of the invention, the solvent is admixed with the organomagnesium composition to form a slurry, which, if desired, may be refluxed for a desirable time period, e.g., 1–2 hours. Subsequently, the compound of formula (II) is added to the slurry, preferably dropwise, to promote the dissolution of the organomagnesium composition in the solvent. The solution may again be refluxed for a desirable period of time, e.g., 1–2 hours. The carrier is then introduced into the solution. Subsequently, the transition metal compound is introduced into the solution. The solvent may be removed by any suitable means, e.g., by distillation.

In this embodiment of the invention, the carrier is treated prior to the use thereof identically to the carrier treated in the multi-step catalyst synthesis procedure. Similarly, the amount of the organomagnesium composition, the compound of formula (II) and the transition metal compound used herein are identical to the respective amounts thereof used in the multi-step catalyst synthesis procedure. Accordingly, the additional details of carrying out the single step catalyst synthesis procedure will be apparent to those skilled in the art from the above description of the multi-step catalyst synthesis procedure.

Catalyst Activation

The supported catalyst precursor, formed in the multi-step or the single step catalyst synthesis procedure, is activated with suitable activators, also known as cocatalysts or catalyst promoters. The activators are known in the art and they include any of the materials commonly employed as promoters for olefin polymerization catalyst components containing compounds of the Group IB, IIA, IIB, IIIB and IVB of the Periodic Chart of the Elements, published by Fisher Scientific Company, Catalog Number 5-702-10, 1978. Examples of such promoters are metal alkyls, hydrides, alkylhydrides, and alkylhalides, such as alkyllithium compounds, dialkylzinc compounds, trialkylboron compounds, trialkylaluminum compounds, alkylaluminum halides and hydrides, and tetraalkylgermanium compounds. Mixtures can also be employed. Specific examples of useful promoters include n-butyllithium, diethylzinc, di-n-propylzinc, triethylboron, triethylaluminum, triisobutylaluminum, tri-n-hexylaluminum, ethylaluminum dichloride, dibromide, and dihydride, isobutyl aluminum dichloride, dibromide, and dihydride, diethylaluminum chloride, bromide, and hydride, di-n-propylaluminum chloride, bromide, and hydride, diisobutylaluminum chloride, bromide, and hydride, tetramethylgermanium, and tetraethylgermanium. Organometallic promoters which are preferred in this invention are Group IIIB metal alkyls and dialkylhalides having 1 to about 20 carbon atoms per alkyl radical. More preferably, the promoter is a trialkylaluminum compound having 1 to about 6 carbon atoms per alkyl radical. The most preferred activator is triethylaluminum. Other promoters which can be used herein are disclosed in Stevens et al, U.S. Pat. No. 3,787,384, column 4, line 45 to column 5, line 12, and in Strobel et al, U.S. Pat. No. 4,148,754, column 4, line 56 to column 5, line 59, the entire contents of both patents being incorporated herein by reference.

The organometallic promoter is employed in an amount which is at least effective to promote the polymerization activity of the solid component of the catalyst of this invention. Preferably, at least about three parts by weight of promoter are employed per part, by weight, of solid catalyst component, although higher ratios, such as 10:1, 25:1, 100:1 or higher, are also suitable and often give highly beneficial results. In slurry polymerization processes, a portion of the promoter can be employed to pretreat the polymerization medium if desired.

The catalyst may be activated in situ by adding the activator and catalyst separately to the polymerization medium. It is also possible to combine the catalyst and the activator before the introduction thereof into the polymerization medium, e.g., for up to about 2 hours prior to the introduction thereof into the polymerization medium at a temperature of from about −40° to about 100° C.

A suitable activating amount of the activator may be used to promote the polymerization activity of the catalyst. The aforementioned proportions of the activator can also be expressed in terms of the number of moles of the activator per gram atom of transition metal in the catalyst of, e.g., from about 1 to about 100 and preferably greater than about 5.

Polymerization

Alpha-olefins may be polymerized with the catalysts prepared according to the present invention by any suitable process. Such processes include polymerizations carried out in suspension, in solution or in the gas phase. Gas phase polymerization reactions are preferred, e.g., those taking place in stirred bed reactors and, especially, fluidized bed reactors.

The molecular weight of the polymer may be controlled in a known manner, e.g., by using hydrogen. With the catalysts produced according to the present invention, molecular weight may be suitably controlled with hydrogen when the polymerization is carried out at relatively low temperatures, e.g., from about 30 to about 105° C. This control of molecular weight may be evidenced by a measurable positive change in melt index ($I_2$) of the polymer produced.

The molecular weight distribution of the polymers prepared in the presence of the catalysts of the present invention, as expressed by the melt flow ratio (MFR) values, varies from about 20 to about 32, preferably about 21 to about 29, for LLDPE products having a density of about 0.900 to about 0.940, and an $I_2$ (melt index) of about 0.1 to about 200. Conversely, HDPE products, produced with the catalysts of this invention, have density of about 0.940 to about 0.965, MFR values of about 20 to about 32, preferably about 21 to about 29, and $I_2$ values of about 0.1 to about 200. As is known to those skilled in the art, such MFR values are indicative of a relatively narrow molecular weight distribution of the polymer. As is also known to those skilled in the art, such MFR values are indicative of the polymers especially suitable for injection molding applications since the polymers having such MFR values exhibit relatively low amounts of warpage and shrinkage on cooling of the injection molded products. The relatively low MFR values of the polymers prepared with the catalysts of this invention also indicate that they are suitable for the preparation of various film products since such films are likely to have excellent strength properties. MFR is defined herein as the ratio of the high load melt index (HLMI or $I_{21}$) divided by the melt index ($I_2$), i.e., $$\text{MFR} = \frac{I_{21}}{I_2}$$

Smaller MFR values indicate relatively narrower molecular-weight distribution polymers.

The catalysts prepared according to the present invention are highly active and may have an activity of at least about 500–10,000 grams of polymer per gram of catalyst per 100 psi of ethylene in about 3 hours.

The linear polyethylene polymers prepared in accordance with the present invention may be homopolymers of ethylene or copolymers of ethylene with one or more $C_3$–$C_{10}$ alpha-olefins. Thus, copolymers havng two monomeric units are possible as well as terpolymers having three monomeric units. Particular examples of such polymers include ethylene/1-butene copolymers, ethylene/1-hexene copolymers, ethylene/1-octene copolymers, ethylene/4-methyl-1-pentene copolymers, ethylene/1-butene/1-hexene terpolymers, ethylene/propylene/1-hexene terpolymers and ethylene/propylene/1-butene terpolymers. When propylene is employed as a comonomer, the resulting linear low density polyethylene polymer preferably has at least one other alpha-olefin comonomer having at least four carbon atoms in an amount of at least 1 percent by weight of the polymer. Accordingly, ethylene/propylene copolymers are possible, but not preferred. The most preferred comonomer is 1-hexene.

The linear low density polyethylene polymers produced in accordance with the present invention preferably contain at least about 80 percent by weight of ethylene units.

A particularly desirable method for producing linear low density polyethylene polymers according to the present invention is in a fluid bed reactor. Such a reactor and means for operating it are described by Levine et al, U.S. Pat. No. 4,011,382, and Karol et al, U.S. Pat. No. 4,302,566, the entire contents of both of which being incoporated herein by reference, and by Nowlin et al, U.S. Pat. No. 4,481,301.

The following Examples further illustrate the essential features of the invention. However, it will be apparent to those skilled in the art that the specific reactants and reaction conditions used in the Examples do not limit the scope of the invention.

EXAMPLE 1

(Multi-Step Synthesis of Inventive Catalyst Composition)

All procedures were carried out in glass or quartz equipment under purified nitrogen using predried nitrogen-purged solvents.

Catalyst Preparation

First Step:

8.0 grams (70.2 milimoles, mmols) of $Mg(OC_2H_5)_2$ was added to a 0.5 liter nitrogen-purged flask fitted with a reflux condenser. 350 mls of dry tetrahydrofuran (THF) was added to the flask and the slurry was refluxed for one (1) hour while stirring. The $Mg(OC_2H_5)_2$ did not dissolve. The flask was cooled to room temperature and 8.0 ml (69.6 mmols) of $SiCl_4$ was added dropwise. The solid $Mg(OC_2H_5)_2$ dissolved rapidly (about 2 minutes) to give a very light yellow solution. 39.5 grams of Davison silica gel Grade 995 (a trademark of and available from the Davison Chemical Division of W. R. Grace and Company, Baltimore, Md.), previously calcined at 800° C. in an atmosphere of dry nitrogen for sixteen hours, was added to the solution, and the solution was refluxed for 30 minutes.

Second Step:

Solvents were removed by distillation to yield 55.2 grams of a dry, free-flowing powder. The product analyzed as follows:

Mg=1.17 mmols/gram; Mg (theory)=1.27 mmols/gram; THF=1.45 mmols/gram (10.4% by weight); Cl=3.09 mmols/gram.

Third Step:

11.6 grams of the product from the second step (13.57 mmols Mg) was placed into 300 ml of dry heptane, and 3.7 ml of $TiCl_4$ (33.7 mmols Ti) was added to the flask and the slurry was refluxed for about 1 hour. The flask was cooled to approximately 35°–40° C., the contents were filtered and washed with 500 ml of dry hexane. The product was dried for 1.5 hours at embient temperature in nitrogen atmosphere. Yield: 9.98 grams of product which analyzed as follows: Mg=1.20 mmols/gram; Ti=0.23 mmols/gram; Cl=3.39 mmols/gram; THF=0.69 mmols/gram.

COMPARATIVE EXAMPLE A (Multi-Step Synthesis of Comparative Catalyst Composition)

A comparative catalyst was synthesized wherein $MgCl_2$ was substituted for $Mg(OC_2H_5)_2$.

Catalyst Preparation

First Step:

7.10 grams (74.7 mmoles) of anhydrous $MgCl_2$ was added to a 0.5 liter nitrogen-purged flask fitted with a reflux condenser. 400 mls of dry THF was added to the flask and the slurry was refluxed for about one (1) hour while stirring. The $MgCl_2$ did not dissolve. The flask was cooled to room temperature and 4.2 ml of $SiCl_4$ (36.6 mmols) was added dropwise. The solid $MgCl_2$ dissolved immediately. 40.5 grams of Davison silica gel Grade 955 (a trademark of and available from the Davison Chemical Division of W. R. Grace and Company, Baltimore, Md.), previously calcined at 800° C. in the atmosphere of dry nitrogen for sixteen hours, was added to the solution and the solution was refluxed for 30 minutes.

Second Step:

Solvents were removed by distillation to yield 54.8 grams of a dry, free-flowing powder. The product analyzed as follows:

Mg=1.08 mmols/gram; Mg (theory)=1.36 mmols/gram; THF=0.76 mmols/gram (5.5% by weight); Cl=3.73 mmols/gram.

Third Step:

9.5 grams of the product from the second step (10.26 mmols Mg) was placed into 250 ml of dry heptane, and 3.0 ml of $TiCl_4$ (27.3 mmols Ti) was added to the flask and the slurry was refluxed for about 1 hour. The flask was cooled to approximately 35°–40° C., the contents were filtered and washed with 500 ml of dry hexane. The product was dried for 1.5 hours at ambient temperature in nitrogen atmosphere. Yield: 9.7 grams of product which analyzed as follows: Mg=1.07 mmols/gram; Ti=0.17 mmols/gram; Cl=3.76 mmols/gram; THF=0.42 mmols/gram.

EXAMPLE 2

(Single Step Synthesis of Inventive Catalyst Composition)

14.7 grams (12.9 mmoles) of $Mg(OC_2H_5)_2$ was added to a 500 ml nitrogen-purged flask fitted with a reflux condenser. 100 mls of dry THF was added to the flask and the slurry was refluxed for ½ hour while stirring. The $Mg(OC_2H_5)_2$ did not dissolve. The flask was cooled to room temperature and 1.45 mls of $SiCl_4$ (12.6 mmols) was added dropwise. The solid $Mg(OC_2H_5)_2$ immediately dissolved to give a very light yellow solution. The contents were refluxed for 15 minutes and 10.2 grams of Davison silica gel Grade 955, previously calcined at 800° C. for 16 hrs, was added to the reaction flask. Then, 0.70 mls of $TiCl_4$ (6.4 mmols of Ti) was added to the flask and the solvents were removed by distillation. Yield: 15.14 gms of product which analyzed as follows: Mg (found)=0.78 mmols/gm; Mg (theory)=0.85 mmols/gm; Ti (found)=0.334 mmols/gm; Ti (theory)=0.42 mmols/gm; Cl (found)=3.18 mmols/gm; THF (found)=2.4 mmols/gm.

COMPARATIVE EXAMPLE B (Single Step Synthesis of Comparative Catalyst Composition)

A comparative catalyst composition, referred to herein as "Comparative Catalyst B" or simply as "Catalyst B", was synthesized by substituting $MgCl_2$ for the $Mg(OC_2H_5)_2$ of the Example 2 catalyst synthesis.

1.20 grams of anhydrous $MgCl_2$ (12.6 mmols of Mg) was used to synthesize this catalyst instead of 1.47 grams of $Mg(OC_2H_5)_2$ used in Example 2. Otherwise, the synthesis was identical to that described in Example 2.

The synthesis yielded 14.82 grams of the product, which analyzed as follows: Mg (found)=0.86 mmols/gm, Mg (theory)=0.85 mmols/gm; Ti (found)=0.42 mmols/gm; Ti (theory)=0.43 mmols/gm; Cl (found)=3.35 mmols/gm; THF (found)=2.41 mmols/gm.

EXAMPLE 3

(Single Step Inventive Catalyst Synthesis)

A catalyst composition of the present invention was synthesized in an attempt to produce catalyst which polymerizes polymer resins having high bulk density.

102.8 grams of Davison silica gel Grade 955, previously calcined at 600° C. for 16 hours, and containing, after the calcination, 74 mmols of Si-OH groups were placed into a one-liter flask containing 500 mls of distilled THF. Then, 8.5 mls of $SiCl_4$ (74 mmols) were added by syringe, the contents were refluxed for one hour and solvents were removed by distillation to give a white powder. The entire powder was slurried into 500 mls of dry hexane. 150 mls of dibutyl magnesium in heptane (0.756 molar solution) was added to the resulting hexane slurry (containing 113.4 mmols of Mg), and 14 mls of ethanol (239 mmols) was also added thereto. The contents were refluxed for one hour and solvents were removed by distillation to produce 125.4 gms of a dry free-flowing product containing 0.90 mmols/gm of Mg (theory). 10.07 gms of that product was added to a nitrogen-purged 500 ml flask containing 100 mls of hexane. The resulting slurry was refluxed and 1.0 mls of $TiCl_4$ (9.1 mmols) was added dropwise thereto. The contents were refluxed for one hour and then solvents were removed by distillation to produce 10.90 grams of a free-flowing solid which analyzed as follows: Mg (theory)=0.83 mmols/gm; Ti (theory)=0.83 mmols/gm; Cl (found)=2.96 mmols/gm.

EXAMPLES 4–5

(Multi-Step Inventive Catalyst Synthesis)

Two more catalyst samples were prepared in accordance with the procedure of Example 1, except that less $SiCl_4$ was used in Example 4 and less $TiCl_4$ was used in Example 5 relative to Example 1. The pertinent parameters of Examples 1, 4 and 5 catalyst synthesis data are listed in Table I below:

TABLE I

| Catalyst of Example | Silica (gms) | Amount of Mg(OC$_2$H$_5$)$_2$ gms | mmols | Amount of SiCl$_4$ gms | mmols | Ti/Mg Molar Ratio |
|---|---|---|---|---|---|---|
| 4 | 40.4 | 8.00 | 70.2 | 11.1 | 64.2 | 2.3 |
| 5 | 41.4 | 8.29 | 72.7 | 11.1 | 64.2 | 2.1 |
| 1 | 39.5 | 8.00 | 70.2 | 11.8 | 68.4 | 2.4 |

COMPARATIVE EXAMPLE C

A comparative catalyst composition was synthesized, using $(C_4H_9)_2Mg$ as the source of Mg, in the manner set forth below:

26.4 grams of Davison grade 955 silica, previously calcined at 800° C. for 16 hours, was added to a nitrogen-purged 500 ml flask fitted with an overhead stirrer. The silica was slurried into 200 mls of dry hexane containing 1.2 mls of $SiCl_4$ (10.4 mmols). The slurry was stirred at room temperature for 0.5 hours. 50.0 mls of dibutyl magnesium (0.6 molar in heptane) was added dropwise over 10 minutes. The solution was stirred for one hour. The silica was allowed to settle, a small aliquot of solution was analyzed for magnesium and none was found. Therefore, all of the magnesium was fixed to the silica.

3.2 mls (29.1 mmols) of $TiCl_4$ was added to the solution. The solution was stirred for 0.5 hours, filtered and washed with 500 ml of dry hexane. No $TiCl_4$ was found in the filtrate. Yield: 33 grams; Mg (Theory)=0.91 mmols/gram; Ti (Theory)=0.88 mmols/gram.

COMPARATIVE EXAMPLE D

A comparative catalyst composition was synthesized with $C_2H_5MgCl$ as the source of Mg, in the manner disclosed by Nowlin et al., U.S. Pat. No. 4,481,301, and briefly summarized below:

Step A:

145.7 grams of Davison silica gel (dried at 800° C. for 16 hours) were placed into a 2000 ml 4-neck reaction flask fitted with a dropping funnel, water condensor, dry nitrogen line, and overhead stirrer. Under a slow nitrogen purge, 1250 ml of dry hexane was added to the silica while stirring. The silica/hexane slurry was brought to reflux temperature and 100 ml of 1.85M $C_2H_5MgCl$/THF solution was added dropwise (about 15 minutes) and the reflux was continued for an additional 65 minutes. After this time, the solvents were removed by distillation and the silica dried at 80° C. for 16 hours under a nitrogen purge.

Step B:

The entire Step A reaction product, less 10 grams, was placed into a 2000 ml reaction flask (apparatus as described above). 1250 ml of n-heptane containing 82 ml (747 mmols) of $TiCl_4$ was added to the flask while stirring. The slurry was refluxed for 120 minutes. After this time, the slurry was cooled to about 60° C., transferred to a filter flask (under nitrogen), filtered, washed with six 330 ml each portions of hexane and dried under nitrogen purge; Yield: 174 grams; Mg (theory)-0.98 mmols/gm; Ti (estimated)-0.6 mmols/gm.

EXAMPLES 6–27

(Polymer Preparation)

Polymers were prepared in a 1.6 liter slurry reactor. Set forth below is a representative procedure for the preparation of the HDPE polymer of Example 14.

1.0 liter of dry hexane was placed into a 1.6 liter stainless steel autoclave at 50° C. and under a slow nitrogen purge. 18 grams of 1-hexene was added with slight nitrogen pressure followed by the addition of 2.0 mls (3.08 mmols) of triethyl aluminum activator as a 25 wt % solution in hexane. The reactor was closed and hydrogen was introduced to raise the internal pressure to 30 psi. The temperature of the reactor was increased to 74° C. while the contents were stirred at 900 rpm. Ethylene was introduced into the reaction at 120 psi and after the reactor contents were saturated with ethylene, 0.0827 grams of the catalyst of Example 2 was injected with slight ethylene overpressure. The reactor was maintained at 80° C. for 60 minutes. After this time, the ethylene flow was stopped and the reactor cooled to ambient temperature.

The polymers of the remaining Examples (Examples 6–13 and 15–27) were prepared in the same apparatus in substantially the same manner as the polymer of Example 14, except for the variable process conditions noted in Table II.

Polymerization conditions and some of product properties are listed in Table II below:

TABLE II

| | POLYMERIZATION CONDITIONS AND PRODUCT DATA FOR C$_2$/C$_6$ COPOLYMERS | | | | | | | | | |
|---|---|---|---|---|---|---|---|---|---|---|
| Example No. | Catalyst of Example | Amt. of Catalyst (gms) | 1-Hexene (gms) | C$_6$C$_2$ Mole Ratio | Run Time (Mins) | Yield (gms) | I$_2$ (gms/10 mins) | MFR | Density (gms/cc) | Product Type | Product Bulk Density (lbs/ft$^3$) |
| 6 | 1 | 0.113 | 112 | 2.39 | 11 | 117 | 17.2 | 26.9 | 0.915 | LLDPE | |
| 7 | 1 | 0.035 | 83 | 1.37 | 55 | 75 | 9.8 | 22.9 | 0.945 | LLDPE | |
| 8 | 1 | 0.095 | 102 | 1.63 | 40 | 128 | 4.74 | 27.3 | 0.935 | LLDPE | |
| 9 | 1 | 0.0824 | 135 | 1.91 | 60 | 118 | 3.84 | 26.8 | 0.934 | LLDPE | |
| | | | | | | Average MFR = | | 26.0 | | | |
| 10 | A | 0.100 | 103 | 1.63 | 40 | 94 | 1.67 | 36.2 | 0.925 | LLDPE | |
| 11 | A | 0.075 | 112 | 2.39 | 27 | 75 | 1.86 | 30.4 | 0.934 | LLDPE | |
| 12 | A | 0.101 | 103 | 1.63 | 40 | 97 | 5.60 | 29.3 | 0.934 | LLDPE | |

TABLE II-continued
POLYMERIZATION CONDITIONS AND PRODUCT DATA FOR C₂/C₆ COPOLYMERS

| Example No. | Catalyst of Example | Amt. of Catalyst (gms) | 1-Hexene (gms) | C₆C₂ Mole Ratio | Run Time (Mins) | Yield (gms) | I₂ (gms/10 mins) | MFR | Density (gms/cc) | Product Type | Product Bulk Density (lbs/ft³) |
|---|---|---|---|---|---|---|---|---|---|---|---|
| 13 | A | 0.101 | 140 | 1.97 | 31 | 128 | 3.16 | 32.6 | 0.928 | LLDPE | |
| | | | | | | | Average MFR = | 32.1 | | | |
| 14 | 2 | 0.0827 | 18 | 0.33 | 60 | 147 | 1.23 | 26.3 | 0.949 | HDPE | |
| 15 | B | 0.1084 | 18 | 0.33 | 30 | 189 | 3.52 | 29.0 | 0.950 | HDPE | |
| 16 | 2 | 0.0841 | 135 | 1.91 | 60 | 168 | 2.69 | 28.9 | 0.932 | LLDPE | |
| 17 | B | 0.0642 | 135 | 1.91 | 30 | 207 | 5.19 | 31.4 | 0.927 | LLDPE | |
| 18 | 3 | 0.1083 | 16 | 0.32 | 65 | 159 | 6.46 | 26.5 | 0.955 | HDPE | 22.3 |
| 19 | 2 | 0.0827 | 18 | 0.33 | 60 | 147 | 1.23 | 26.3 | 0.949 | HDPE | 14.7 |
| 20 | B | 0.1084 | 18 | 0.33 | 30 | 189 | 3.52 | 29.0 | 0.950 | HDPE | 15.0 |
| 21 | 1 | 0.0824 | 135 | 1.91 | 60 | 118 | 3.84 | 26.8 | 0.934 | LLDPE | |
| 22 | 4 | 0.0584 | 135 | 1.91 | 55 | 97 | 4.19 | 27.6 | 0.933 | LLDPE | |
| 23 | 5 | 0.1390 | 135 | 1.91 | 30 | 176 | 2.21 | 27.9 | 0.933 | LLDPE | |
| 24 | D | 0.0828 | 135 | 1.91 | 45 | 180 | 1.59 | 31.9 | 0.923 | LLDPE | |
| 25 | D | 0.0740 | 103 | 1.63 | 51 | 195 | 2.85 | 33.0 | 0.927 | LLDPE | |
| 26 | C | 0.0980 | 135 | 1.91 | 18 | 188 | 2.86 | 35.4 | 0.933 | LLDPE | |
| 27 | C | 0.0462 | 135 | 1.91 | 40 | 167 | 2.30 | 34.3 | 0.936 | LLDPE | |

The comparison of the polymerization data of Examples 6-9, 14, 16 and 21-23, reporting the polymer properties, prepared with the catalysts of this invention, with the data of Examples 10-13, 15, 17 and 24-27, reporting the polymer properties prepared with the comparative catalysts, illustrates that the catalyst compositions of this invention produce polymer resins having substantially lower MFR values, suggesting narrower molecular weight distribution of these polymers than those prepared with the comparative catalysts synthesized with sources of Mg other than $(OR')_nMg(OR)_m$.

Additionally, the comparison of the data of Examples 18 and 19 with the data of Example 20 buttresses that conclusion. The comparison of the data of Examples 18 and 19 with the data of Example 20 also indicates that the catalyst of Example 3, utilized in Example 18, is preferred because it produces polymers having a substantially higher bulk density than the catalysts of Examples 2 and B, utilized in Examples 19 and 20, respectively.

It will be apparent to those skilled in the art that the specific embodiments discussed above can be successively repeated with ingredients equivalent to those generically or specifically set forth above and under variable process conditions.

From the foregoing specification, one skilled in the art can readily ascertain the essential features of this invention and without departing from the spirit and scope thereof can adapt it to various diverse applications.

We claim:

1. A process for preparing a supported catalyst composition for use in alpha-olefin polymerization reactions which comprises the steps of:

(i) contacting a solid, porous carrier with a solution of a mixture of at least one organomagnesium composition having the empirical formula $$(OR')_nMg(OR)_m \quad (I)$$

where R and R' are the same or different and they are $C_1$-$C_{12}$ hydrocarbyl groups, m and n are each 0, 1 or 2, provided that the sum of m+n is equal to the valence of Mg, and at least one compound of the formula $$MX_p \quad (II)$$

where M is Si, C, Ge or Sn, X is Cl or Br, and p is the valence of M, in a solvent selected from the group consisting of alkyl esters of aliphatic carboxylic acids, alkyl esters of aromatic carboxylic acids, aliphatic ethers, cyclic ethers and aliphatic ketones, the solvent dissolving the composition of formula (I) in the presence of the compound of formula (II);

(ii) removing said solvent from step (i) to obtain a magnesium-containing carrier in the form of a substantially dry, free-flowing powder; and, (iii) slurrying said powder of step (ii) in a liquid medium and contacting the resulting slurry with at least one transition metal compound, said transition metal compound being soluble in said liquid medium, and said magnesium-containing carrier being substantially insoluble in said liquid medium.

2. A process of claim 1 wherein R and R' are $C_1$-$C_5$ alkyl groups.

3. A process of claim 2 wherein R and R' are $C_1$-$C_3$ alkyl groups.

4. A process of claim 3 wherein R and R' are each $CH_3$— or $C_2H_5$—.

5. A process of claim 4 wherein M is Sn or Si and X is chlorine.

6. A process of claim 5 wherein M is Si.

7. A process of claim 6 wherein the transition metal compound is a compound of titanium or vanadium.

8. A process of claim 7 wherein the transition metal compound is titanium halide.

9. A process of claim 8 wherein the titanium halide is titanium tetrahalide.

10. A process of claim 9 wherein the titanium tetrahalide is $TiCl_4$.

11. A process of claim 10 wherein the amount of the $TiCl_4$ present in said solution of step (iii) is such that the molar ratio of Ti to Mg is about 0.3 to about 10.

12. A process of claim 11 wherein the amount of the $TiCl_4$ present in said solution of step (iii) is such that the molar ratio of Ti to Mg is about 0.4 to about 6.

13. A process of claim 12 wherein the amount of the $TiCl_4$ present in said solution of step (iii) is such that the molar ratio of Ti to Mg is about 0.8 to about 1.5.

14. A process of claim 13 wherein the solid, porous carrier is silica which, prior to contact thereof with the solvent in step (i), is heated at a temperature of about 100° C. to about 1000° C.

15. A process of claim 14 wherein the silica is heated at a temperature of about 150° C. to about 850° C.

16. A process of claim 15 wherein the silica is heated at a temperature of about 800° C.

17. A process of claim 16 wherein the carrier is silica having a surface hydroxyl group concentration of about 0.5 mmoles/gr, a surface area of 300 m²/gram and a pore volume of 1.65 m³/gram.

18. A supported alpha-olefin polymerization catalyst composition prepared by a process comprising the steps of:
(i) contacting a solid, porous carrier with a solution of a mixture of at least one organomagnesium composition having the empirical formula $$(OR')_n Mg(OR)_m \quad (I)$$

where R and R' are the same or different and they are $C_1$-$C_{12}$ hydrocarbyl groups, m and n are each 0, 1 or 2, provided that the sum of m+n is equal to the valence of Mg, and at least one compound of the formula $$MX_p \quad (II)$$

where M is Si, C, Ge or Sn, X is Cl or Br, and p is the valence of M, in a solvent selected from the group consisting of alkyl esters of aliphatic carboxylic acids, alkyl esters of aromatic carboxylic acids, aliphatic ethers, cyclic ethers and aliphatic ketones, the solvent dissolving the composition of formula (I) in the presence of the compound of formula (II);
(ii) removing said solvent from step (i) to obtain a magnesium-containing carrier in the form of a substantially dry, free-flowing powder; and,
(iii) slurrying said powder of step (ii) in a liquid medium and contacting the resulting slurry with at least one transition metal compound, said transition metal compound being soluble in said liquid medium, and said magnesium-containing carrier being substantially insoluble in said liquid medium.

19. A catalyst composition of claim 18 wherein R and R' are $C_1$-$C_5$ alkyl groups.

20. A catalyst composition of claim 19 wherein R and R' are $C_1$-$C_3$ alkyl groups.

21. A catalyst composition of claim 20 wherein R and R' are each $CH_3$— or $C_2H_5$—.

22. A catalyst composition of claim 21 wherein M is Sn or Si and X is chlorine.

23. A catalyst composition of claim 22 wherein M is Si.

24. A catalyst composition of claim 23 wherein the transition metal compound is a compound of titanium or vanadium.

25. A catalyst composition of claim 24 wherein the transition metal compound is titanium halide.

26. A catalyst composition of claim 25 wherein the titanium halide is titanium tetrahalide.

27. A catalyst composition of claim 26 wherein the titanium tetrahalide is $TiCl_4$.

28. A catalyst composition of claim 27 wherein the amount of the $TiCl_4$ present in said solution of step (iii) is such that the molar ratio of Ti to Mg is about 0.3 to about 10.

29. A catalyst composition of claim 28 wherein the amount of the $TiCl_4$ present in said solution of step (iii) is such that the molar ratio of Ti to Mg is about 0.4 to about 6.0.

30. A catalyst composition of claim 29 wherein the amount of the $TiCl_4$ present in said solution of step (iii) is such that the molar ratio of Ti to Mg is about 0.8 to about 1.5.

31. A catalyst composition of claim 30 wherein the solid, porous carrier is silica which, prior to contact thereof with the solvent in step (i), is heated at a temperature of about 100° C. to about 1000° C.

32. A catalyst composition of claim 31 wherein the silica is heated at a temperature of about 150° C. to about 850° C.

33. A catalyst composition of claim 32 wherein the carrier is heated at a temperature of about 800° C.

34. A catalyst composition of claim 33 wherein the carrier is silica having a surface hydroxyl group concentration of about 0.5 mmoles/gr, a surface area of 300 m²/gram and a pore volume of 1.65 m³/gram.

35. A process for preparing a supported catalyst composition for use in alpha-olefin polymerization reactions comprising contacting a solid, porous carrier with a mixture of at least one organomagnesium composition having the empirical formula $$(OR')_n Mg(OR)_m \quad (I)$$

where R and R' are the same or different and they are $C_1$-$C_{12}$ hydrocabyl groups, m and n are each 0, 1 or 2, provided that the sum of m+n is equal to the valence of Mg, and at least one compound of the formula $$MX_p \quad (II)$$

where M is Si, C, Ge or Sn, X is Cl, or Br, and p is the valence of M, in a solvent selected from the group consisting of alkyl esters of aliphatic carboxylic acids, alkyl esters of aromatic carboxylic acids, aliphatic ethers, cyclic ethers and aliphatic ketones, the solvent dissolving the composition of formula (I) in the presence of the compound of formula (II), and contacting the resulting slurry with at least one transition metal compound soluble in said solvent.

36. A process of claim 17 wherein the solvent used in step (i) is selected from the group consisting of alkyl esters of saturated aliphatic carboxylic acids containing 1 to 4 carbon atoms, alkyl esters of aromatic carboxylic acids containing 7 to 8 carbon atoms, aliphatic ethers containing 2 to 8 carbon atoms, cyclic ethers containing 4 to 5 carbon atoms and aliphatic ketones containing 3 to 6 carbon atoms.

37. A process of claim 36 wherein the solvent used in step (i) is a cyclic ether containing 4 to 5 carbon atoms.

38. A process of claim 37 wherein the solvent is tetrahydrofuran or dioxane.

39. A process of claim 38 wherein the solvent is tetrahydrofuran.

40. A process of claim 39 wherein the molar amount of the compound of the formula (II) in the solution of the step (i) is at least sufficient to substantially completely dissolve the organomagnesium composition in the solution.

41. A process of claim 40 wherein the molar ratio of the compound of the formula (II) to the organomagnesium composition is about 0.1 to about 10.

42. A process of claim 41 wherein the molar ratio of the compound of the formula (II) to the organomagnesium composition is about 0.5 to about 2.0.

43. A catalyst composition of claim 34 wherein the solvent used in step (i) is selected from the group consisting of alkyl esters of saturated aliphatic carboxylic acids containing 1 to 4 carbon atoms, alkyl esters of aromatic carboxylic acids containing 7 to 8 carbon atoms, aliphatic ethers containing 2 to 8 carbon atoms, cyclic ethers containing 4 to 5 carbon atoms and aliphatic ketones containing 3 to 6 carbon atoms.

44. A catalyst composition of claim 43 wherein the solvent used in step (i) is a cyclic ether containing 4 to 5 carbon atoms.

45. A catalyst composition of claim 44 wherein the solvent is tetrahydrofuran or dioxane.

46. A catalyst composition of claim 45 wherein the solvent is tetrahydrofuran.

47. A catalyst composition of claim 46 wherein the molar amount of the compound of the formula (II) in the solution of the step (i) is at least sufficient to substantially completely dissolve the organomagnesium composition in the solution.

48. A catalyst composition of claim 47 wherein the molar ratio of the compound of the formula (II) to the organomagnesium composition is about 0.1 to about 10.

49. A catalyst composition of claim 48 wherein the molar ratio of the compound of the formula (II) to the organomagnesium composition is about 0.5 to about 2.0.

50. A process of claim 35 wherein R and R' are $C_1$-$C_5$ alkyl groups.

51. A process of claim 50 wherein R and R' are $C_1$-$C_3$ alkyl groups.

52. A process of claim 51 wherein R and R' are each $CH_3$— or $C_2H_5$—.

53. A process of claim 52 wherein M is Sn or Si and X is chlorine.

54. A process of claim 53 wherein M is Si.

55. A process of claim 54 wherein the transition metal compound is a compound of titanium or vanadium.

56. A process of claim 55 wherein the transition metal compound is titanium halide.

57. A process of claim 56 wherein the titanium halide is titanium tetrahalide.

58. A process of claim 57 wherein the titanium tetrahalide is $TiCl_4$.

59. A process of claim 58 wherein the amount of $TiCl_4$ is such that the molar ratio of Ti to Mg is about 0.3 to about 10.

60. A process of claim 59 wherein the amount of $TiCl_4$ is such that the molar ratio of Ti to Mg is about 0.4 to about 6.0.

61. A process of claim 60 wherein the amount of $TiCl_4$ is such that the molar ratio of Ti to Mg is about 0.8 to about 1.5.

62. A process of claim 61 wherein the solid, porous carrier is silica which, prior to the contact thereof with the solvent, is heated at a temperature of about 100° C. to about 1000° C.

63. A process of claim 62 wherein the silica is heated at a temperature of about 150° C. to about 850° C.

64. A process of claim 63 wherein the silica is heated at a temperature of about 800° C.

65. A process of claim 64 wherein the carrier is silica having a surface hydroxyl group concentration of about 0.5 mmoles/gr, a surface area of 300 m²/gram and a pore volume of 1.65 m³/gram.

66. A process of claim 65 wherein the solvent is selected from the group consisting of alkyl esters of saturated aliphatic carboxylic acids containing 1 to 4 carbon atoms, alkyl esters of aromatic carboxylic acids containing 7 to 8 carbon atoms, aliphatic ethers containing 2 to 8 carbon atoms, cyclic ethers containing 4 to 5 carbon atoms and aliphatic ketones containing 3 to 6 carbon atoms.

67. A process of claim 66 wherein the solvent is a cyclic ether containing 4 to 5 carbon atoms.

68. A process of claim 67 wherein the solvent is tetrahydrofuran or dioxane.

69. A process of claim 68 wherein the solvent is tetrahydrofuran.

70. A process of claim 69 wherein the molar amount of the compound of the formula (II) is at least sufficient to substantially completely dissolve the organomagnesium composition in the solution.

71. A process of claim 70 wherein the molar ratio of the compound of the formula (II) to the organomagnesium composition is about 0.1 to about 10.

72. A process of claim 71 wherein the molar ratio of the compound of the formula (II) to the organomagnesium composition is about 0.5 to about 2.0.

73. A supported alpha-olefin polymerization catalyst composition prepared by contacting a solid, porous carrier with a mixture of at least one organomagnesium composition having the empirical formula $$(OR')_n Mg(OR)_m \quad \text{(I)}$$

where R and R' are the same or different and they are $C_1$-$C_{12}$ hydrocarbyl groups, m and n are each 0, 1 or 2, provided that the sum of m+n is equal to the valence of Mg, and at least one compound of the formula $$MX_p \quad \text{(II)}$$

where M is Si, C, Ge or Sn, X is Cl or Br, and p is the valence of M, in a solvent selected from the group consisting of alkyl esters of aliphatic carboxylic acids, alkyl esters of aromatic carboxylic acids, aliphatic ethers, cyclic ethers and aliphatic ketones, the solvent dissolving the composition of formula (I) in the presence of the compound of formula (II), and contacting the resulting slurry with at least one transition metal compound soluble in said solvent.

74. A catalyst composition of claim 73 wherein R and R' are $C_1$-$C_5$ alkyl groups.

75. A catalyst composition of claim 74 wherein R and R' are $C_1$-$C_3$ alkyl groups.

76. A catalyst composition of claim 75 wherein R and R' are each $CH_3$— or $C_2H_5$—.

77. A catalyst composition of claim 76 wherein M is Sn or Si and X is chlorine.

78. A catalyst composition of claim 77 wherein M is Si.

79. A catalyst composition of claim 78 wherein the transition metal compound is a compound of titanium or vanadium.

80. A catalyst composition of claim 79 wherein the transition metal compound is titanium halide.

81. A catalyst composition of claim 80 wherein the titanium halide is titanium tetrahalide.

82. A catalyst composition of claim 81 wherein the titanium tetrahalide is $TiCl_4$.

83. A catalyst composition of claim 82 wherein the amount of $TiCl_4$ is such that the molar ratio of Ti to Mg is about 0.3 to about 10.

84. A catalyst composition of claim 83 wherein the amount of $TiCl_4$ is such that the molar ratio of Ti to Mg is about 0.4 to about 6.0.

85. A catalyst composition of claim 84 wherein the amount of $TiCl_4$ is such that the molar ratio of Ti to Mg is about 0.8 to about 1.5.

86. A catalyst composition of claim 85 wherein the solid, porous carrier is silica which, prior to the contact thereof with the solvent, is heated at a temperature of about 100° C. to about 1000° C.

87. A catalyst composition of claim 86 wherein the silica is heated at a temperature of about 150° C. to about 850° C.

88. A catalyst composition of claim 87 wherein the silica is heated at a temperature of about 800° C.

89. A catalyst composition of claim 88 wherein the carrier is silica having a surface hydroxyl group concentration of about 0.5 mmols/gr, a surface area of 300 m²/gram and a pore volume of 1.65 m³/gram.

90. A catalyst composition of claim 89 wherein the solvent is selected from the group consisting of alkyl esters of saturated aliphatic carboxylic acids containing 1 to 4 carbon atoms, alkyl esters of aromatic carboxylic acids containing 7 to 8 carbon atoms, aliphatic ethers containing 2 to 8 carbon atoms, cyclic ethers containing 4 to 5 carbon atoms and aliphatic ketones containing 3 to 6 carbon atoms.

91. A catalyst composition of claim 90 wherein the solvent is a cyclic ether containing 4 to 5 carbon atoms.

92. A catalyst composition of claim 91 wherein the solvent is tetrahydrofuran or dioxane.

93. A catalyst composition of claim 92 wherein the solvent is tetrahydrofuran.

94. A catalyst composition of claim 93 wherein the molar amount of the compound of the formula (II) is at least sufficient to substantially completely dissolve the organomagnesium composition in the solution.

95. A catalyst composition of claim 94 wherein the molar ratio of the compound of the formula (II) to the organomagnesium composition is about 0.1 to about 10.

96. A catalyst composition of claim 95 wherein the molar ratio of the compound of the formula (II) to the organomagnesium composition is about 0.5 to about 2.0.

* * * * *

UNITED STATES PATENT AND TRADEMARK OFFICE
CERTIFICATE OF CORRECTION

PATENT NO. : 4,738,942

DATED : 4/19/88

INVENTOR(S) : Thomas E. Nowlin

It is certified that error appears in the above-identified patent and that said Letters Patent is hereby corrected as shown below:

Column 2, line 68, "(OR')Mg(OR)$\underline{m}$" should be --(OR')$\underline{n}$Mg(OR)$\underline{m}$--

Column 18, Claim 35, line 25, "hydrocabyl" should be --hydrocarbyl--

Signed and Sealed this

Twentieth Day of September, 1988

*Attest:*

DONALD J. QUIGG

*Attesting Officer*     *Commissioner of Patents and Trademarks*